US008416742B2

(12) United States Patent
Park et al.

(10) Patent No.: US 8,416,742 B2
(45) Date of Patent: Apr. 9, 2013

(54) MOBILE SERVICE RECEPTION METHOD AND MOBILE SERVICE RECEIVER

(75) Inventors: Sung-il Park, Suwon-si (KR); Hae-joo Jeong, Seoul (KR); Hye-kyoung Yoo, Suwon-si (KR); Jong-hwa Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 337 days.

(21) Appl. No.: 12/940,437

(22) Filed: Nov. 5, 2010

(65) Prior Publication Data

US 2011/0110318 A1 May 12, 2011

Related U.S. Application Data

(60) Provisional application No. 61/258,686, filed on Nov. 6, 2009.

(30) Foreign Application Priority Data

Feb. 9, 2010 (KR) ........................ 10-2010-0012028

(51) Int. Cl.
*H04W 4/00* (2009.01)

(52) U.S. Cl.
USPC ........................................... 370/329; 370/328

(58) Field of Classification Search .................. 370/328, 370/329
See application file for complete search history.

(56) References Cited

U.S. PATENT DOCUMENTS

| | | | | |
|---|---|---|---|---|
| 2009/0052585 | A1 | 2/2009 | Song et al. | |
| 2009/0064244 | A1 | 3/2009 | Shin et al. | |
| 2009/0257391 | A1* | 10/2009 | Song et al. | 370/329 |
| 2010/0195638 | A1* | 8/2010 | Song et al. | 370/349 |
| 2011/0280343 | A1* | 11/2011 | Song et al. | 375/321 |
| 2012/0014300 | A1* | 1/2012 | Lee et al. | 370/310 |

FOREIGN PATENT DOCUMENTS

KR 10-0606804 B1 7/2006

OTHER PUBLICATIONS

International Search Report, dated Jun. 24, 2011, issued in Application No. PCT/KR2010/007818.

* cited by examiner

*Primary Examiner* — Kenny Lin
(74) *Attorney, Agent, or Firm* — Sughrue Mion, PLLC

(57) ABSTRACT

A mobile service reception method and a mobile service receiver are provided. The mobile service reception method includes performing a channel scan operation comprising searching in one or more frequencies for a broadcast signal which includes mobile data for providing a mobile service and generating a list of a plurality of mobile services, selecting at least one mobile service from the list, and processing mobile data for the selected at least one mobile service by obtaining at least one parade through which the selected at least one mobile service is transmitted, wherein a parade forms one Reed Solomon (RS) frame or two RS frames.

17 Claims, 10 Drawing Sheets

MOBILE SERVICE RECEPTION METHOD AND MOBILE SERVICE RECEIVER

CROSS-REFERENCE TO RELATED PATENT APPLICATIONS

This application claims priority from U.S. Provisional Application No. 61/258,686 filed on Nov. 6, 2009 and Korean Patent Application No. 10-2010-0012028 filed on Feb. 9, 2010, the disclosures of which are incorporated herein in their entirety by reference.

BACKGROUND

1. Field of the Invention

Methods and apparatuses consistent with exemplary embodiments relate to receiving a broadcasting service, and more particularly, to receiving a mobile broadcasting service.

2. Description of the Related Art

Among a variety of digital broadcasting standards, a vestigial sideband (VSB) standard adopted as a digital broadcasting standard for North America and the Republic of Korea is based on a single-carrier scheme, in which the performance of a reception system may deteriorate under poor channel environments. In particular, a portable or mobile broadcasting system requires high resistance to a channel variation and noise. So, if mobile service data is transmitted according to the VSB transmission scheme, reception performance may become deteriorated.

SUMMARY

According to an aspect of an exemplary embodiment, there is provided a mobile service reception method including performing a channel scan operation comprising searching in one or more frequencies for a broadcast signal which includes mobile data for providing a mobile service and generating a list of a plurality of mobile services, selecting at least one mobile service from the list, and a processing mobile data for the selected at least one mobile service by obtaining at least one parade through which the selected at least one mobile service is transmitted, wherein a parade forms one Reed Solomon (RS) frame or two RS frames.

The generating the list of the plurality of mobile services is performed based on at least one of Fast Information Channel (FIC) data comprising access information regarding a parade of a corresponding mobile service and a service signaling table comprising additional information regarding the corresponding mobile service, according to a scan mode.

The processing the mobile data may include, if at least two mobile services are selected, processing the mobile data corresponding to the at least two mobile services based on a parade repetition cycle (PRC) value indicating a period in which each of the at least two mobile services is transmitted.

The processing the mobile data may include, if at least two mobile services are selected, adding identification information of an ensemble through which each of the at least two mobile services is transmitted to an Internet protocol (IP) address of IP packets for transmission to an upper layer.

According to an aspect of another exemplary embodiment, there is provided a mobile service receiver including a channel scan unit which searches in one or more frequencies for a broadcast signal which includes mobile data for providing a mobile service and generates a list of a plurality of mobile services, a service selection unit which selects at least one mobile service from the list, and a service output unit which processes mobile data for the selected at least one mobile service by obtaining at least one parade through which the selected at least one mobile service is transmitted, wherein a parade forms one RS frame or two RS frames.

BRIEF DESCRIPTION OF THE DRAWINGS

The above and/or other aspects will become more apparent by describing in detail exemplary embodiments with reference to the attached drawings in which.

DETAILED DESCRIPTION OF EXEMPLARY EMBODIMENTS

Hereinafter, exemplary embodiments will be described with reference to the accompanying drawings.

Basic Operation of ATSC M/H Receiver

Figure 1:
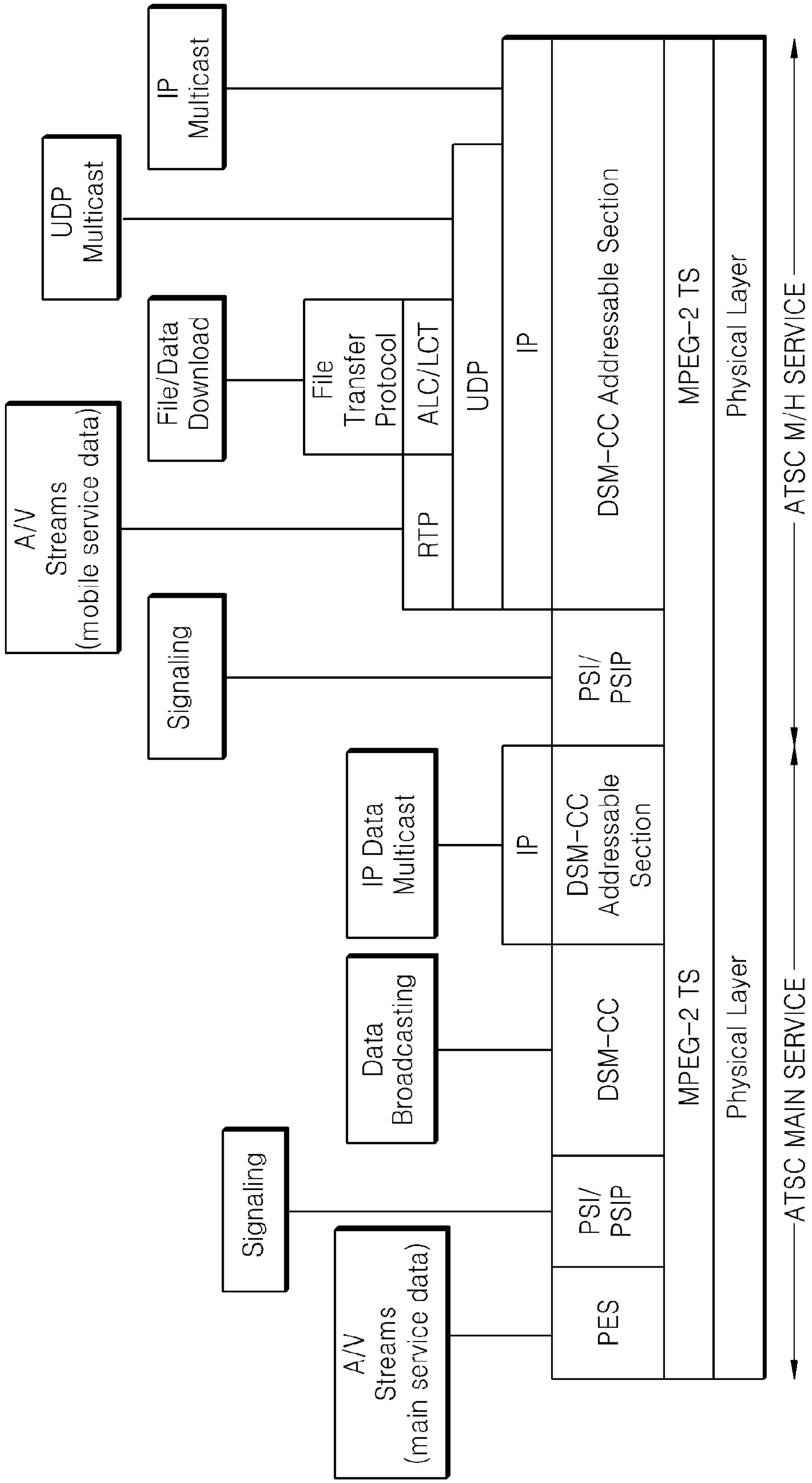
FIG. 1 is a diagram illustrating an example of a protocol stack of a mobile transmission system according to an exemplary embodiment.

FIG. 1 is a diagram illustrating an example of a protocol stack of a mobile transmission system according to an exemplary embodiment.

The mobile transmission system according to an exemplary embodiment is a dual transmission system. That is, in a single system, data for a mobile broadcasting service and data for a main digital broadcasting service are multiplexed and transmitted.

In FIG. 1, audio/video (A/V) streams for a main service are elementary streams (ES) and are packetized according to a packetized elementary stream (PES) scheme, and the PES packets are each packetized into Moving Picture Expert Group (MPEG)-2 transport stream (TS) packets, each composed of 188 bytes. Signalling information such as program and system information (PSI)/program and system information protocol (PSIP), which includes configuration information of each service, is sectioned. That is, signalling information such as PSI/PSIP tables is divided into a plurality of sections. For example, a virtual channel table (VCT) in the PSIP may be divided into 256 sections. Each section may carry information about several virtual channels, but information about a virtual channel is not divided into two or more sections. Hereinafter, the signalling information in the form of a table will be referred to as program table information or a program table.

Data broadcasting is sectioned according to a digital storage media-command and control (DSM-CC) scheme, and the DSM-CC section is packetized into MPEG-2 TS packets, each composed of 188 bytes. An IP datagram for IP multicast is encapsulated in a DSM-CC addressable section structure, and the encapsulated DSM-CC addressable section is packetized into MPEG-2 TS packets, each composed of 188 bytes. The TS packetization is performed on a network layer.

The packetized TS packets of the PES type or TS packets of the section type are modulated according to a predefined transmission scheme (for example, a VSB transmission scheme) on a physical layer and transmitted to a reception system.

In FIG. 1, the signalling information for the mobile service is encapsulated in a section structure such as PSI/PSIP. A/V streams for a mobile service are packetized according to a real time protocol (RTP) scheme on an IP layer, the RTP packets are packetized according to a user datagram protocol (UDP) scheme, and the RTP/UDP packets are then packetized according to the IP scheme into RTP/UDP/IP packet data. Herein, the packetized RTP/UDP/IP packet data will be referred to as an IP datagram for convenience' sake.

The IP datagram is encapsulated in a DSM-CC addressable section structure, and the encapsulated DSM-CC addressable section is packetized into MPEG-2 TS packets, each composed of 188 bytes.

A single addressable section is configured such that an RTP header, a UDP header, an IP header, and an addressable section header are added in front of A/V data, and stuffing data (optional) and a cyclic redundancy check (CRC) are added at rear of the A/V data. The addressable section is divided in the unit of 184 bytes, and a TS packet header of 4 bytes is added to every divided 184 byte packet, thus forming TS packets, each composed of 188 bytes.

In FIG. 1, file/data download is packetized according to a file transfer protocol scheme and packetized again according to an asynchronous layered coding/layered coding transport (ALC/LCT) scheme. The ALC/LCT packet is packetized according to the UDP scheme, and the ALC/LCT/UDP packet is packetized according to the IP scheme into ALC/LCT/UDP/IP packet data. Herein, the packetized ALC/LCT/UDP/IP packet data will be referred to as an IP diagram for convenience' sake. The IP datagram is encapsulated into a DSM-CC addressable section structure, and the encapsulated DSM-CC addressable section is packetized into MPEG-2 TS packets, each composed of 188 bytes.

UDP multicast is packetized according to the UDP scheme, and the UDP packet is packetized according to the IP scheme. IP multicast is packetized according to the IP scheme. The IP datagram packetized according to the IP scheme is encapsulated in a DSM-CC addressable section structure, and the encapsulated DSM-CC addressable section is packetized into MPEG-2 TS packets, each composed of 188 bytes.

To the A/V streams for the mobile service are sequentially added the RTP header, the UDP header, and the IP header, thus forming a single IP datagram. In another exemplary embodiment, a transport parameter of the signalling information for the mobile service may be configured as an IP datagram.

The MPEG-2 TS packets are modulated according to a predefined transmission scheme (for example, a VSB transmission scheme) on a physical layer and transmitted to a reception system.

A TS stream associated with the mobile service may be transmitted independently of a normal TS stream associated with a broadcasting service, or may be transmitted through an adaptation field of the normal TS stream.

In some exemplary embodiment, an adaptation layer may be included between an IP layer and a physical layer, so that the mobile service can transmit an IP datagram and a program information table (e.g., a PSI/PSIP) without using an MPEG-2 TS format.

Figure 2:
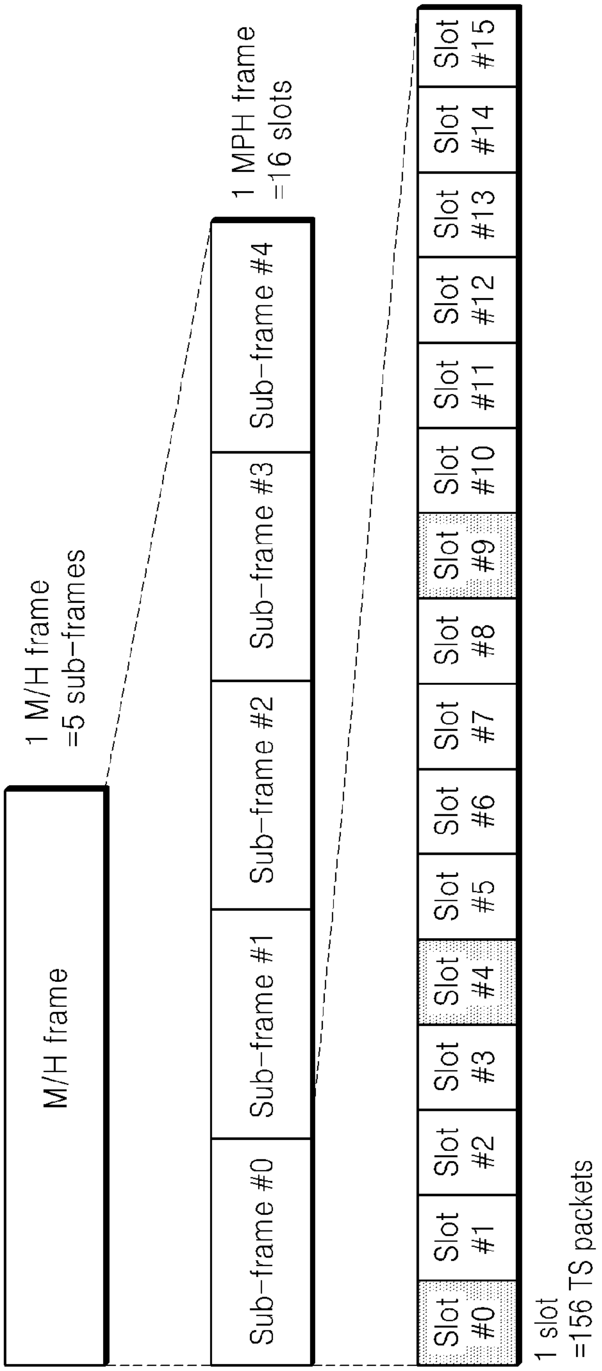
FIG. 2 is a diagram illustrating a structure of an M/H frame according to an exemplary embodiment.

FIG. 2 is a diagram illustrating a structure of a mobile/handheld (M/H) frame according to an exemplary embodiment.

A single M/H frame includes a plurality of (for example, 5) sub-frames, each composed of a plurality of (for example, 16) slots. Each slot is composed of a plurality of (for example, 156) packets. A slot is a time period for multiplexing mobile service data and main service data. In a single slot, only the main service data may be included or both the main service data and the mobile service data may be included together.

Data belonging to a same parade are present as far away as possible from each other, thereby improving the error-resistance of the data. Referring to FIG. 2, data groups belonging to a parade are disposed in the first slot, the fourth slot, and the ninth slot according to Equation (1).

$$j=(4i+0)\bmod 16 \qquad (1)$$

Here, 0=0 if $i<4$,
0=2 else if $i<8$,
0=1 else if $i<12$,
0=3 else.

Herein, a parade indicates a set of data groups which provide one or more mobile services. A single parade transmits one or two RS frames in an RS frame mode. More specifically, a single parade may transmit a primary RS frame or both the primary RS frame and a secondary RS frame. As described above, an M/H frame may be sub-divided into 5 equal-length M/H sub-frames, each composed of 16 successive slots for M/H data, thereby defining 80 slots for M/H data in each M/H frame. The related M/H data within a selected set of the 80 slots in an M/H frame is referred to as a parade. Each parade is composed of one ensemble or of two ensembles located in different portions of slots.

Figure 3:
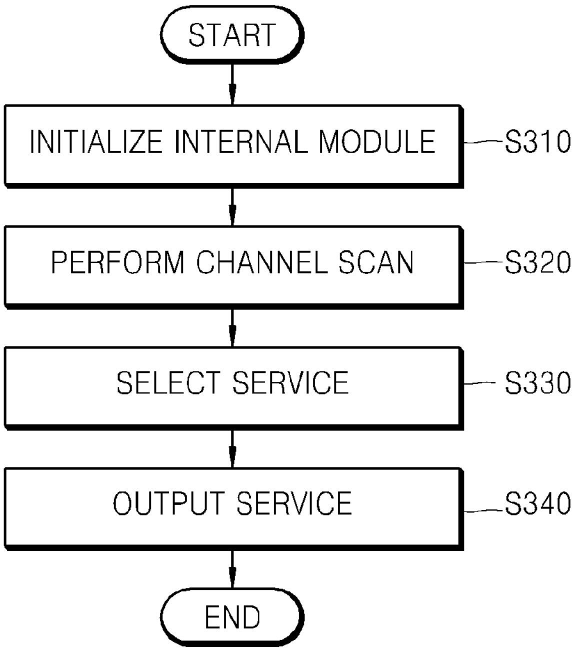
FIG. 3 is a flowchart illustrating an operation of an Advanced Television Systems Committee (ATSC) mobile/handheld (M/H) receiver according to an exemplary embodiment.

FIG. 3 is a flowchart illustrating an operation of an advanced television systems committee (ATSC) M/H receiver according to an exemplary embodiment.

In operation S310, upon application of power to the ATSC M/H receiver, an internal module is initialized to operate the receiver. For example, hardware and software, such as a power source, a memory, a register, a user interface, an ATSC M/H channel list, an M/H system binary, and an input/output interface for operating the receiver, are prepared and initialized.

In operation S320, a channel scan operation for one or more frequencies is performed. The channel scan operation includes determining whether an ATSC M/H signal exists in one or more frequency channels and configuring an ATSC M/H service list.

In operation S330, one or more services are selected from the service list. A service may be selected by user's input or a service selected last before termination of the receiver may be selected in operation S330.

In operation S340, data associated with the selected service is processed. The receiver provides the selected service by using the processed data. The receiver may perform a related operation according to a service type, such as store the processed data in a storage device or output the processed data on a screen.

Operations S310 through S340 are merely examples of the operation of the ATSC M/H receiver, and thus they may be performed in different orders or omitted, or other operations may be added thereto.

Channel Scan

Figure 4:
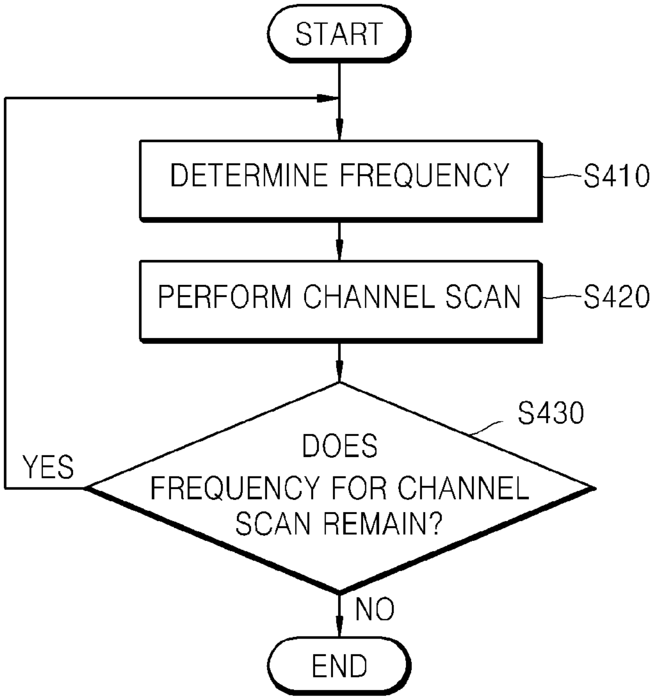
FIG. 4 is a flowchart illustrating a channel scan method according to an exemplary embodiment.

FIG. 4 is a flowchart illustrating a channel scan method according to an exemplary embodiment. Channel scan means a process of receiving and processing data associated with an ATSC M/H service which exists in a corresponding frequency band in one or more frequencies.

In operation S410, a frequency at which channel scan is to be performed is determined.

In operation S420, channel scan is performed at the determined frequency. More specifically, a frequency of a radio frequency (RF) tuner of the receiver is set, and then, an ATSC M/H signal is searched. Once the ATSC M/H signal is found, data associated with an M/H service is gathered and processed.

In operation S430, the receiver determines whether there exists another frequency at which channel scan is to be performed. The receiver may perform channel scan at a single frequency or at each of a plurality of frequencies. When the receiver performs channel scan at each of the plurality of frequencies, it has to perform channel scan at all of the plurality of frequencies. Therefore, if the receiver determines that any frequency at which channel scan is to be performed remains, the receiver repeats operations S410 and S420.

In case of channel scan at each of the plurality of frequencies, if the receiver does not detect any M/H signal at a particular one of the plurality of frequencies, the receiver stops channel scan at that frequency and resumes searching for an M/H signal at the next frequency.

For example, it is assumed that channel scan is requested at frequencies corresponding to channels 3, 4, and 5, and the channels 3 and 5 are ATSC M/H channels and the channel 4 is an analog channel, that is, a non-ATSC M/H channel. The receiver, upon determining that the channel 4 is not an ATSC M/H channel during channel scan at a frequency corresponding to the channel 4, stops the channel scan and resumes the channel scan at a frequency corresponding to the channel 5. In this way, the receiver performs channel scan only at the frequencies corresponding to the channels 3 and 5.

Figure 5A:
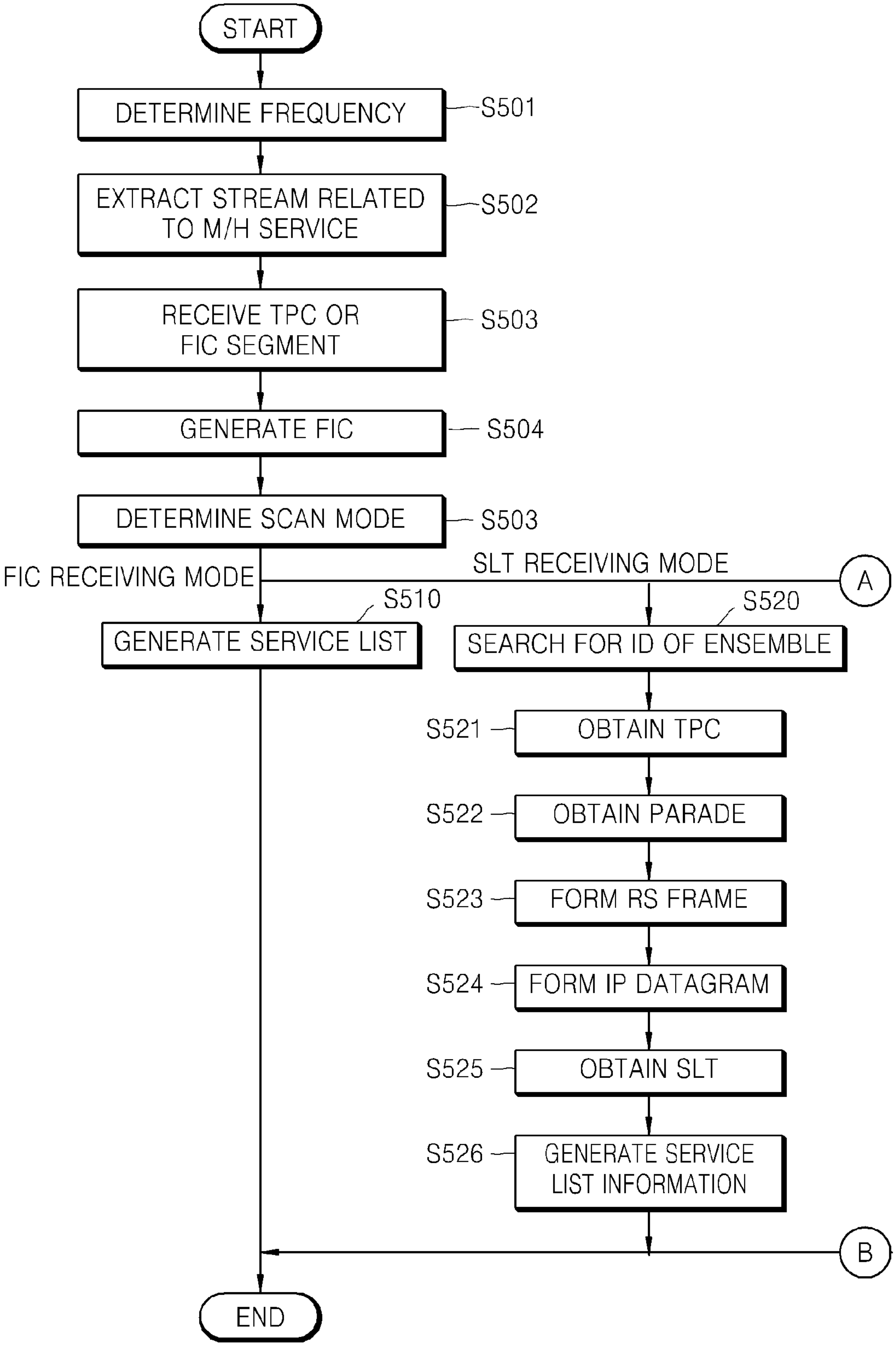
FIGS. 5A and 5B are flowcharts illustrating a method of performing channel scan by a receiver in a channel scan mode according to an exemplary embodiment.
Figure 5B:
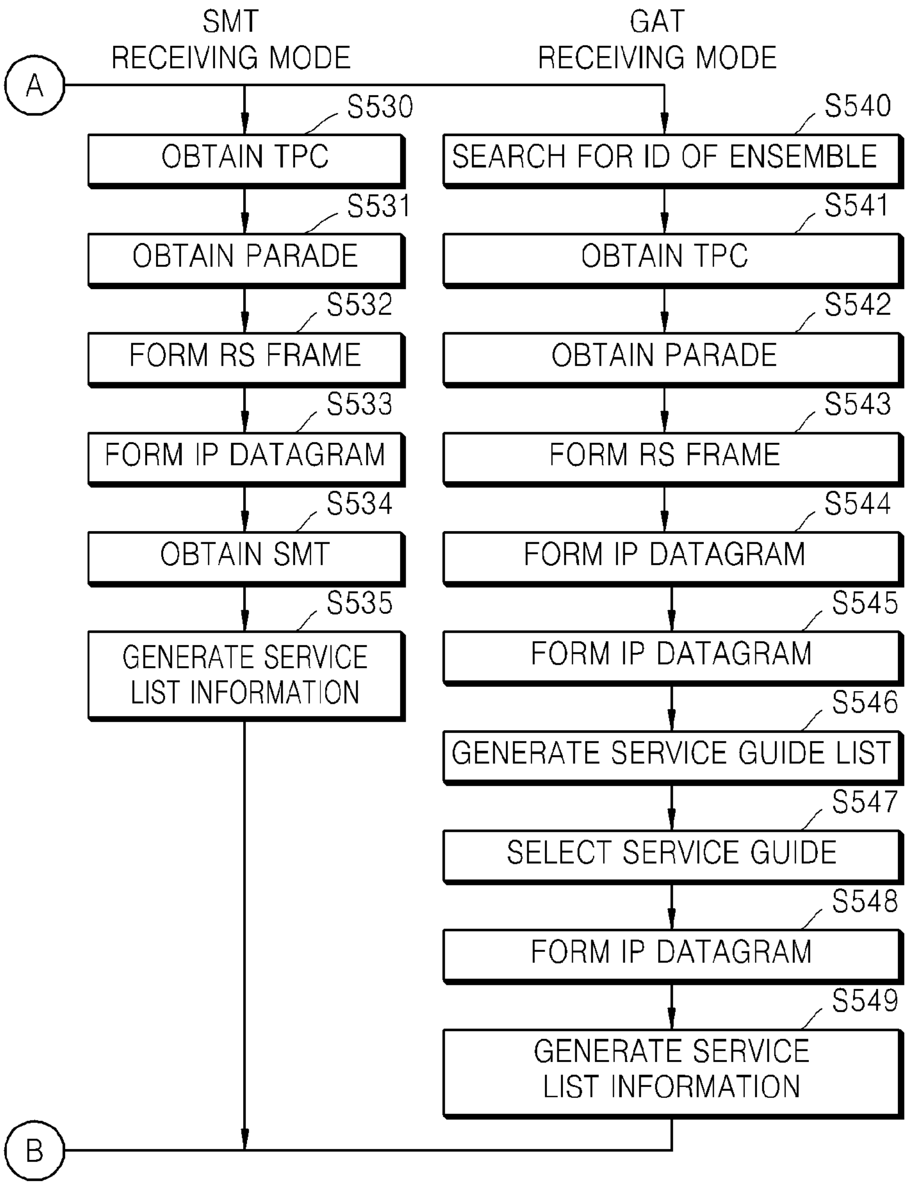

FIGS. 5A and 5B are a flowchart illustrating a method of performing channel scan in a channel scan mode by a receiver according to an exemplary embodiment.

In FIGS. 5A and 5B, it is assumed that channel scan is performed at a single frequency. Even for channel scan at a plurality of frequencies, except that channel scan is repeated a predetermined number of times corresponding to the number of frequencies and information about the plurality of frequencies is added to a channel list, the same description may be applied as in FIGS. 5A and 5B, and thus, will not be provided additionally.

In operation S501, the receiver determines a frequency at which channel scan is to be performed.

In operation S502, the receiver extracts a stream associated with an M/H service corresponding to the frequency from an 8-level vestigial sideband (8VSB) stream.

In operation S503, the receiver receives a transmission parameter channel (TPC) or a fast information channel (FIC) segment from each slot.

The TPC segment is provided for data including coding information and position information of a slot for processing data included in a parade. The TPC segment may include a sub-frame_number field, a slot_number field, a parade_id field, a starting_group_number (SGN) field, a number_of_groups (NoG) field, a parade_repetition_cycle (PRC) field, an RS_frame_mode field, an RS_code_mode_primary field, an RS_code_mode_secondary field, an FIC_version field, a parade_continuity_counter field, and a total number of group (TNoG) field.

The sub-frame_number field represents a number of a current sub-frame in an M/H frame. When the M/H frame is composed of 5 sub-frames, the sub-frame_number field may have a value of 0-4.

The slot_number field represents a number of a current slot in a sub-frame. When the sub-frame is composed of 16 slots, the slot_number field may have a value of 0-15.

The parade_id field represents an identifier for identifying a parade corresponding to TPC data. The parade_id field may have a value of 7 bits. In a single M/H transmission, each parade has a unique parade_id. Communication of a parade_id between a physical layer and an upper layer is made through an ensemble_id formed by adding 1 bit to the left of the parade_id. An ensemble_id for identifying a primary ensemble transmitted through a parade is formed by adding 0 to an MSB of the parade_id, and an ensemble_id for identifying a secondary ensemble formed by adding 1 to the MSB of the parade_id.

The SGN field represents a first slot number of a parade corresponding to TPC data. SGN and NoG to be described later are used to obtain a slot number to which the corresponding parade is allocated in a sub-frame according to Equation (1).

The NoG field represents the number of groups allocated to the parade.

The PRC field represents a repetition period of a parade transmitted in the unit of an M/H frame.

The RS_frame_mode field represents whether a single parade transmits a single RS frame or two RS frames.

The FIC_version field represents a version of FIC data.

The parade_continuity_counter field increases from 0 to 15 and one by one every (PRC+1) MPH frame.

The TNoG field represents the number of total data groups allocated in a sub-frame.

The FIC segment is provided for data including mapping information between an ensemble and a mobile service to achieve a fast mobile service. The FIC data includes cross layer information between a physical layer and an upper layer.

If it is determined that previously received FIC data has been stored, but has not yet been updated, as a result of checking a version of the FIC data through the TPC data, the FIC segment is not received and the stored FIC data is used instead.

In operation S504, the receiver generates FIC chunk (or FIC) data by using the FIC segment. However, if valid FIC data exists, operation S504 may be omitted. The valid FIC means that information capable of signaling services provided at a current frequency is all valid.

The FIC data provides information about types of services provided in a current M/H frame and information about ensembles through which the provided services are transmitted. More specifically, the FIC includes an ensemble_loop field corresponding to each of ensembles included in the current M/H frame.

The ensemble_loop field includes information about types of services corresponding to ensembles and brief information about corresponding services.

The FIC data may also include access information about a service labeling table (SLT), a service map table (SMT), and guide access table (GAT).

The FIC data may include an SLT_ensemble_indicator and a GAT_ensemble_indicaotor. Herein, it will be assumed that in the FIC, a SLT_ensemble_indicator (having a field value of '1') is set in an ensemble loop for an ensemble '0x01', a SLT_ensemble_indicator and a GAT_ensemble_indicaotor are set in an ensemble loop for an ensemble '0x02', and a GAT_ensemble_indicaotor is set in an ensemble loop for an ensemble '0x03'.

The receiver may obtain access information about SLT and GAT through the above-described FIC data Shown in Table 1 is an example of the access information for SLT and GAT obtained through the FIC data.

TABLE 1

| Type | Ensemble id list |
|---|---|
| SLT access information | 0x01, 0x02 |
| GAT access information | 0x02, 0x03 |

In operation S505, a scan mode is determined. According to a scan mode, one of operations S510, S520, S530, and S540 is selectively performed. A scan mode may comply with basic settings of the receiver or may be determined by user's selection.

Herein, a scan mode may be classified into an FIC receiving mode, a SLT receiving mode, a SMT receiving mode, and an GAT receiving mode. Herein, a scan mode has been classified according to a type of a service signaling table used in generation of a service list.

<FIC Receiving Mode>

When a scan mode is determined as the FIC receiving mode, operation S510 is performed.

In operation S510, the receiver bit-parses FIC data to extract a header and a payload, which are then stored in corresponding fields according to the ATSC M/H standard. Information necessary for forming a service list is also parsed from the payload.

The receiver repeats a process of obtaining information about services through ensemble_loop fields of the FIC data a number of times that is equal to the number of ensembles, thereby obtaining the information necessary for forming the service list provided in the current M/H frame.

Service list information is generated by using the parsed information. Shown in Table 2 is an example of the service list information generated using the FIC data.

TABLE 2

| Ensemble id | Service id | Multi ensemble mode | Service status | Service protection |
|---|---|---|---|---|
| 0x01 | 0x0101 | Multi | Active | Free |
| | 0x0102 | Single | Inactive | Free |
| | 0x0103 | Single | Active | Free |
| | 0x0104 | Single | Active | Free |
| 0x02 | 0x0101 | Multi | Active | Free |
| | 0x0202 | Single | Hidden | Free |
| | 0x0203 | Single | Active | Protected |

In Table 2, a multi ensemble mode field is information indicating whether a service is transmitted through a single ensemble or a plurality of ensembles. A service status field indicates a current status of a service, and a service protection field is information indicating whether a service has been encrypted.

Table 2 shows an example where service list information is generated based on an ensemble identification (ID). Since the service list information is generated according to a format of information received through the FIC data in Table 2, it is not easy for a user to intuitively recognize a user desired service.

Shown in Table 3 is another example of the service list generated using the FIC data.

TABLE 3

| Service id | Ensemble id | Multi ensemble mode | Service status | Service protection |
|---|---|---|---|---|
| 0x0101 | 0x01, 0x02 | Multi | Active | Free |
| 0x0102 | 0x01 | Single | Inactive | Free |
| 0x0103 | 0x01 | Single | Active | Free |
| 0x0104 | 0x01 | Single | Active | Free |
| 0x0101 | 0x01 | Multi | Active | Free |
| 0x0202 | 0x01, 0x02 | Single | Hidden | Free |
| 0x0203 | 0x02 | Single | Active | Protected |
| . . . | | | | |

Table 3 shows an example in which mapping information is configured based on a service ID. In this case, the user can easily recognize a provided service and ensemble transition is easy to perform when the user selects a service.

Although not shown in Table 2 and Table 3, the service list information may include frequency information and connection information such as an M/H transport stream (TS) ID. When the frequency information is included in the service list information, the receiver may easily perform frequency transition. When the scan mode is the FIC information receiving mode, a service list based on the service list information of Table 2 or Table 3 may be output to the user. However, in other scan modes described below, other data (for example, SLT, SIT, and GAT) may be further received and then service list information including detailed information about services may be output.

<SLT Receiving Mode>

When a scan mode is determined as the SLT receiving mode, operation S520 is performed. In the SLT receiving mode, service list information including brief description information about services in the form of a text is provided by using SLT data.

In operation S520, the receiver searches for an ID of an ensemble through which the SLT data is transmitted. The ID of the ensemble through which the SLT data is transmitted may be known from a SLT_indicator field of the FIC data as described regarding operation S505.

In operation S521, the receiver obtains TPC data corresponding to a parade in which the SLT data is transmitted.

To this end, first, an ID of the parade is obtained. The parade's ID is a value of 7 bits remaining in the ensemble's ID except for a most significant bit (MSB).

Next, TPC data is extracted from a slot included in each sub-frame included in a currently received M/H frame. Based on a parade's ID stored in the extracted TPC data, it is determined whether the extracted TPC data is TPC data corresponding to a parade that transmits SLT data.

Last, the TPC data is extracted from a slot. If there exists previously stored TPC data, the stored TPC may be used without searching slots.

In operation S522, the receiver obtains a parade that transmits SLT data. The TPC data includes numbers of slots including a parade and channel coding information capable of processing the parade. Thus, the receiver processes and gathers data of a slot included in a desired parade by using the TPC data.

In this case, a part of modules in the receiver may not operate until a desired slot is received. When a part of modules do not operate, power of the RF module is cut off, thus reducing power consumption and overhead caused by unnecessary TPC processing.

A parade is formed using the gathered data. The TPC data, a long training sequence, and timing information obtained during processing and gathering of a slot will be used to estimate a channel environment and control a parameter according to the estimated channel environment.

In operation S523, the receiver forms an RS frame. The receiver determines whether the parade obtained using the MSB of the ensemble's ID is received as a primary RS frame or a secondary RS frame, and then, forms the RS frame. Thereafter, the receiver performs error correction on the RS frame.

In operation S524, the receiver forms an IP datagram. To this end, the receiver extracts M/H TP data from the RS frame and parses a header of the M/H transport packet (TP) data to gather network packets (for example, an IPv4 datagram).

In operation S525, the receiver receives IP packets including SLT data. In an exemplary embodiment, an UDP/IP datagram received at IP address 224.0.23.60/port number 4937 may indicate a service signaling table. The service signaling table is information for signaling service related information, which is a table including service related information such as an SLT, an SMT, and a GAT.

The receiver parses a header of the service signaling table to determine whether the service signaling table has a table ID corresponding to the SLT data.

In operation S526, the receiver parses the SLT data to obtain information about services. An SLT_MH_protocol_version is checked from a table header of the received SLT data to determine whether the version is one that can be processed by the current M/H receiver. If the version is a version that cannot be processed, the SLT data is not processed (however, if the protocol version can be processed by updating a service signaling table module, the SLT data may be parsed).

The receiver receives and stores information about services whose number is equal to a value of the num_MH_services field based on the parsed SLT data. Information that can be included in the information about services may vary, and for example, may include service IDs and brief description information about services.

The service IDs and the brief description information about services may be obtained by bit-level parsing. More specifically, by parsing length information regarding the description information and a bit sequence in which the description information is stored, brief information about services can be obtained.

Each character included in the description information may be read on a 2-byte basis, and UTF[8] decoding may be performed on each character. To obtain description information about all services included in the SLT data, bit-sequence processing is performed a number of times that is equal to a value of the num_descriptor field.

The receiver generates service list information based on the parsed information. Information about services obtained through the SLT data may be stored in a storage device in connection with a category, a service name, and description information. Shown in Table 4 is an example of service list information generated using SLT data according to an exemplary embodiment.

TABLE 4

| Service id | Short_MH service_name | Service category | Ensemble id | Multi ensemble mode | Service status | Service protection |
|---|---|---|---|---|---|---|
| 0x0101 | KBC-1 | Basic TV | 0x01, 0x02 | Multi | Active | Free |
| 0x0102 | KBC-2 | Basic TV | 0x01 | Single | Inactive | Free |
| 0x0103 | KBC-3 | Basic radio | 0x01 | Single | Active | Free |
| 0x0104 | KBC-4 | Basic TV | 0x01 | Single | Active | Free |
| 0x0101 | KBC-5 | RI service | 0x01 | Multi | Active | Free |
| 0x0202 | DATA | Service guide | 0x01, 0x02 | Single | Hidden | Free |
| 0x0203 | SBC-2 | Basic TV | 0x02 | Single | Active | Protected |
| . . . | | | | | | |

Information about services has been added to Table 4, from which the user can easily obtain the information about services when compared to from Table 2 or Table 3.

A category of a service may be briefly indicated in the service list information.

According to an exemplary embodiment, if a service status field is set to 'hidden' or 'inactive', it may be deleted to prevent user's confusion. In particular, a service in which the service status field is set to 'hidden' may not be shown in the service list information to prevent the user from selecting the service. In addition, the ensemble ID field and the multi ensemble mode field are information required for the receiver to search for a service, and thus, may not be displayed to the user.

When the receiver outputs a service list, it may convert a service's name included in the short service MH name field into a text format that can be output by the receiver, and then outputs the service list to the user.

According to an exemplary embodiment, the remaining parts of the SLT data may exist in another RS frame or another ensemble. In this case, the foregoing process is repeated with respect to the corresponding RS frame or ensemble.

<SMT Receiving Mode>

The SMT receiving mode is the same as the SLT receiving mode except for some operations. However, since SMT data exists in every RS frame, a process of searching for an ensemble including SMT data is not necessary. That is, the SMT data is received and processed for every RS frame.

In operation S530, the receiver obtains TPC data corresponding to a parade that transmits SMT data.

In operation S531, the receiver obtains the parade that transmits the SMT data.

In operation S532, the receiver forms an RS frame.

In operation S533, the receiver forms an IP datagram.

In operation S534, the receiver receives IP packets including the SMT data. An UDP/IP datagram received at IP address 224.0.23.60/port number 4937 may indicate a service signaling table. A table ID included in a header of the service signaling table is checked. If the table ID is 0xDB, the service signaling table is determined as the SMT data.

In operation S535, the receiver parses the SMT data to obtain information about services. SMT_MH_Protocol_version is checked from a table header of the received SMT data to determine whether the version can be processed by a current M/H receiver. If the version cannot be processed by the current M/H receiver, the SMT data is not used.

The receiver receives and stores information about services whose number is equal to a value of the num_MH_services field based on the parsed SMT data. An SMH_service_id for identifying a service basically exists in the service loop field included in the SMT data. The service loop field may also include access information about components forming each service, component information for processing, configuration information for a component decoder, service protection information, an IP address for each component, and a port number. Thus, the receiver parses corresponding information.

The receiver generates service list information based on the information about services obtained through the SMT data. Shown in Table 5 is an example of the service list information generated using the SMT data according to an exemplary embodiment.

When compared to Table 2 and Table 3, Table 5 may further include IP addresses (source or destination addresses) and port numbers (source or destination ports) of components forming each service, and decoder setting information (for example, audio configuration information and video configuration information) necessary for processing IP streams.

<GAT Receiving Mode>

To present detailed service information to the user, the GAT mode is used. A method of receiving GAT data is the same as the method of receiving the SLT data. However, GAT_ensemble_indicator is used in place of SLT_ensemble_indicator.

In the GAT receiving mode, identification information and position information regarding a service guide (SG) included in streams are received. Upon reception of the position information regarding the SG, data forming the SG is received.

In operation S540, the receiver searches for an ID of an ensemble through which GAT data is transmitted.

In operation S541, the receiver obtains TPC data regarding a parade that transmits the GAT data.

In operation S542, the receiver forms the parade based on the TPC data.

In operation S543, the receiver forms an RS frame.

In operation S544, the receiver extracts an IP datagram from the RS frame.

In operation S545, the receiver obtains the GAT data from the IP datagram.

In operation S546, a SG list is generated.

In operation S547, the receiver selects an SG.

In operation S548, the receiver extracts an IP datagram including the selected SG.

TABLE 5

| Service id | Short_MH service_name | Component IP address/port | Configuration | Service category | Ensemble id | Multi ensemble mode | Service status | Service protection |
|---|---|---|---|---|---|---|---|---|
| 0x0101 | KBC-1 | xx.xx.xx.xx/ 8000 xx.xx.xx.xx/ 8002 | Yyyyy Yyyyy | Basic TV | 0x01, 0x02 | Multi | Active | Free |
| 0x0102 | KBC-2 | xx.xx.xx.xx/ 8000 xx.xx.xx.xx/ 8002 | Yyyyy Yyyyy | Basic TV | 0x01 | Single | Inactive | Free |
| 0x0103 | KBC-3 | xx.xx.xx.xx/ 8000 xx.xx.xx.xx/ 8002 | Yyyyy Yyyyy | Basic radio | 0x01 | Single | Active | Free |
| 0x0104 | KBC-4 | xx.xx.xx.xx/ 8000 xx.xx.xx.xx/ 8002 | Yyyyy Yyyyy | Basic TV | 0x01 | Single | Active | Free |
| 0x0101 | KBC-5 | xx.xx.xx.xx/ 8000 xx.xx.xx.xx/ 8002 | Yyyyy Yyyyy | RI service | 0x01 | Multi | Active | Free |
| 0x0202 | DATA | xx.xx.xx.xx/ 8000 xx.xx.xx.xx/ 8002 | Yyyyy Yyyyy | Service guide | 0x01, 0x02 | Single | Hidden | Free |
| 0x0203 | SBC-2 | xx.xx.xx.xx/ 8000 xx.xx.xx.xx/ 8002 | Yyyyy Yyyyy | Basic TV | 0x02 | Single | Active | Protected |
| . . . | | | | | | | | |

In operation S549, the receiver generates service list information based on the extracted IP datagram.

Shown in Table 6 is an example of the service list information generated using information obtained by receiving the GAT data.

TABLE 6

| SG provider name | MH service id | Announcement channel TSI | IP address/port | URL |
|---|---|---|---|---|
| KBC-1 | 0x0202 | 0x1101 | NULL | NULL |
| KBC-2 | NULL | 0x1102 | 1.2.3.4/1004 | NULL |
| KBC-3 | NULL | 0x1103 | NULL | "http://www.samsung.com/SG" |

The user may select an SG through a SG provider name or other information and receive data forming the SG by using access information regarding the SG. An access to the SG complies with the Open Mobile Alliance-Broadcast (OMA-BCAST) standard.

Referring to Table 6, an SG transmitted by an M/H transmission system is signaled by an M/H SG and an SG transmitted through an external communication network may be accessed through an IP address or an uniform resource locator (URL).

<Channel Scan Timeout>

The receiver determines whether an M/H signal providing an M/H service is transmitted at a selected frequency. The receiver may determine that the M/H signal is not transmitted at that frequency if any M/H signal has not been received at that frequency for a predetermined time. The predetermined time as a criterion for determining that any M/H signal is not received may be defined as a timeout time.

The receiver considers a remote procedure call (RPC) value when setting the timeout time. The RPC value is information indicating the number of M/H frames per transmission of a service. For example, a service having '1' as the RPC value is transmitted every M/H frame and a service having '2' as the RPC value is transmitted every two M/H frames. That is, when a service having '2' as the RPC value is searched, the receiver determines whether an M/H signal is transmitted at a corresponding frequency for a time corresponding to at least two M/H frames. If the receiver is not aware of the RPC value for a corresponding service, the receiver determines whether an M/H signal is transmitted for a time corresponding to a maximum RPC value (for example, 7).

Output of Service List

Shown in Table 7 is an example of a service list that is output based on service list information generated by channel scan. According to a scan mode or policy, a type of information included in a service list is subject to change.

TABLE 7

| Service id | Service name | Service category |
|---|---|---|
| 11-1 (Service protected) | [Charged] Movie - Future of Samsung | Basic TV - Movie |
| 11-2 (Free) | [Free] Movie - Past of Samsung | Basic TV - Documentary |
| 13-2 | [SG] Channel guide | [M/H] Service guide |
| 15-1 | [SG] Full & Rich channel guide | [OOB] Service guide |

The service list shown in Table 7 includes a service ID, a service name, and a service category.

The service ID may be expressed by connecting an upper 1 byte and a lower 1 byte with the use of a separating symbol. Such an expression is used in an ATSC digital TV (DTV) to give familiarity to the user and allow the user to easily recognize a service number. According to an exemplary embodiment, the service ID may be expressed with 16 bits without a separating symbol.

The item 'service name' indicates a service's name. In the service name item, 'MH_Short_Service_name' of Table 4 may be indicated.

According to an exemplary embodiment, information indicating a service is a charged service or a free service may be added to a service ID or a service name. In other words, information indicating a service name and information indicating a charged service may be indicated in the service name item or information indicating a service ID and information indicating a charged service may be indicated in the service id item. Whether a corresponding service is a charged service may be checked from a SP_indicator field of FIC data or a descriptor of SMT data. In case of a charged service, the user may be notified that an additional action (for example, purchase of contents) may be required to view the charged service. In case of a free service, information indicating a service name and information indicating a free service may be indicated in the service name item, or information indicating a free service may be omitted (that is, only the 'MH_short_service_name' item may be indicated).

Referring to Table 7, by adding information "service protected" to a service id 11-1, it is indicated that a service corresponding to the service ID 11-1 is a charged service. By adding information "free" to service IDs 11-2, 13-2, and 15-1 or indicating only the service IDs, it is indicated that services corresponding to the service ids 11-2, 13-2, and 15-1 are free services.

As shown in Table 7, a user interface, which allows user's easy recognition, may be established by adding charged/free information in front of the MH_short_service_name item "Future of Samsung" and adding "Movie" (genre information) to the service category item. These settings of the user interface are subject to change at the request of the user.

The 'service category' item indicates a category of a service. In the 'service category' item, a category of a service may be hierarchically indicated. For example, a service may be coarse-classified as one of 'Basic TV', 'Charged TV', and 'Service guide' and fine-classified as one of 'Movie', 'Documentary', and 'News'. For genre information, coarse classification and fine classification can be checked from the genre descriptor field of the service signaling table (for example, SMT data). In this way, by hierarchically showing a category of a service, the user can easily recognize a detailed genre of the service.

In the service list, the route of service acquisition may be indicated. For general mobile broadcasting, it is not necessary to indicate the route of acquisition. For an SG, however, it is necessary to indicate the route of acquisition. The route of acquisition of the SG may be checked from GAT data.

The SG may be received through not only the M/H transmission system but also an out-of-band (OOB) such as an external communication network. When the SG can be acquired through the M/H transmission system, it may be indicated on the user interface to inform the user that the user can receive the SG without using an additional or external network. On the other hand, when the SG can be acquired only through a network other than the M/H transmission system (for example, by using an IP address or an URL), the user is informed that an access to an external network is necessary, thereby improving user convenience. When the network other than the M/H transmission system is a network requiring additional payment, it should be notified to the user.

In the latter case, the IP address or URL with which the SG can be acquired may be included in the service list, but it is not shown in Table 7.

<Output of Rating Information>

The service list may further include rating information. In the ATSC M/H system, a rating region table, which is a sort of service signaling table, may be defined to transmit rating information and region information. The receiver may obtain rating information for each service from the rating region table, and indicate the rating information in the service list.

Shown in Table 8 is an example of the service list including the rating information.

TABLE 8

| Service id | Rating | Service name | Service category |
|---|---|---|---|
| 11-1 (SP) | 18+ | [Charged] Movie - Future Wars | Basic TV - Movie |
| 11-2 (Free) | 15+ | [Free] Movie - Past of Samsung | Basic TV - Documentary |
| 13-2 | 12+ | [SG] Channel guide | [M/H] Service guide |
| 15-1 | 12+ | [SG] Full & Rich channel guide | [OOB] Service guide |

To avoid providing unsuitable contents to the user, a juvenile protection mode may be set. Services that can be viewed by viewers may change according to the juvenile protection mode. For example, if the juvenile protection mode is set to services allowed for viewing of persons under 15 years of age, viewers cannot view services allowed for viewing of persons at and over 15 years of age. Thus, in this case, the services ID 11-1 and 11-2 are not shown in the service list.

<Region Information>

The rating region table may include information about a region where each service is provided. The receiver checks a region where each service is provided from the rating region table and indicates the region in the service list. If the user's current position can be recognized by using a device such as a global positioning system (GPS), a service, which is not allowed for viewing of the user, may not be indicated in the service list. For example, if the user is located in Seoul and a terminal can know the user's location, the service id 11-2 is not indicated in the service list. Thus, the user can view only the service ids 11-1, 11-2, 13-2, and 15-1. Such region information is subject to change according to settings.

Shown in Table 9 is an example of the service list where region information is indicated according to an exemplary embodiment.

TABLE 9

| Service id | Region | Service name | Service category |
|---|---|---|---|
| 11-1 (SP) | Seoul | [Charged] Movie - Future Wars | Basic TV - Movie |
| 11-2 (Free) | Suwon | [Free] Movie - Past of Samsung | Basic TV - Documentary |
| 13-2 | Whole country | [SG] Channel guide | [M/H] Service guide |
| 15-1 | Whole country | [SG] Full & Rich channel guide | [OOB] Service guide |

<Service Change Indication>

A broadcasting time of a mobile service may change for some reason such as the occurrence of an urgent situation. Broadcasting time information may be received through current_program_descriptor. If the broadcasting time information is different from time information acquired from a previously received SG or service signaling table, time information received through the current_program_descriptor is shown to the user. At this time, information before the change and information after the change may be shown to the user together. In particular, name and time information of the changed service may be added to the service list, thereby allowing the user to easily recognize whether the service has changed.

Upon reception of information about the changed service through the SG, detailed information about the changed service acquired through the SG may be added to update the service list.

If the detailed information about the changed service fails to be acquired, a name or a providing time of the changed service is added to the service list by using the current_program_descriptor. In this case, service start time and end time may not be shown to the user Shown in Table 10 is an example of the service list including service change information according to an exemplary embodiment. Although the changed service is indicated by a cancellation mark in Table 10, information before the change may not be shown to the user according to some exemplary embodiments.

TABLE 10

| Service id | Duration | Service name | Service category |
|---|---|---|---|
| 11-1 (SP) | 11:00~12:00 | [Free] Breaking news - Heavy Rain Watch | Basic TV - Sports |
| 11-2 (Free) | 11:00~12:00 | [Free] Movie - Past of Samsung | Basic TV - Documentary |
| 13-2 | 13:00~15:00 | [SG] Channel guide | [M/H] Service guide |
| 15-1 | 13:00~15:00 | [SG] Full & Rich channel guide | [OOB] Service guide |

<Service Selection>

The user selects a desired service from the service list. When the user selects one or more services, an ensemble corresponding to each of the selected services are sequentially processed or ensembles corresponding to the selected services are simultaneously processed.

According to an exemplary embodiment, the one or more services may be transmitted over a plurality of ensembles. When the receiver can process the plurality of ensembles at the same time, it is determined whether to process the ensembles at the same time, taking account of hardware resources of the receiver. That is, the ensembles are simultaneously processed by considering resources of the receiver such as a memory.

For example, a resource of 1 M bytes/seconds is required to process an ensemble #1 and a resource of 3 M bytes/seconds is required to process each of an ensemble #2 and an ensemble #3. If it is assumed that an ensemble processing module can use a resource of 5 M bytes/seconds, the receiver can process the ensemble #1 and the ensemble #2 at the same time, but cannot process the ensemble #3 simultaneously with the ensemble #1 and the ensemble #2. Thus, when the user selects a service corresponding to the ensemble #1 and a service corresponding to the ensemble #2, the receiver may update the service list to make it impossible to select a service corresponding to the ensemble #3.

According to settings, the selection of the service corresponding to the ensemble #3 may be made possible, and the first selected service may be removed from the service list instead, thereby adding the service corresponding to the ensemble #3 to the service list.

Service Execution 1 (when Broadcasting Service is Selected)

Figure 6:
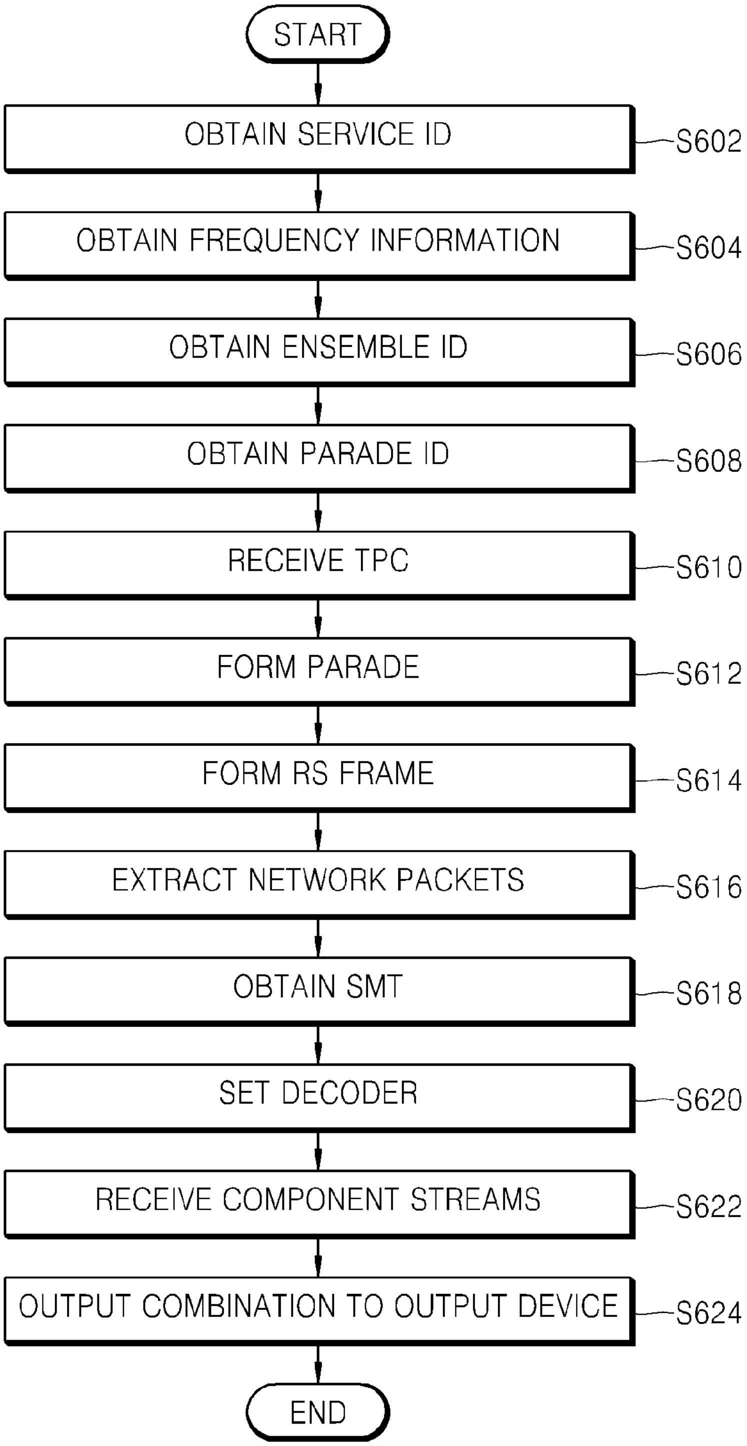
FIG. 6 is a flowchart illustrating a method of executing a service by a receiver according to an exemplary embodiment.

FIG. 6 is a flowchart illustrating a method of executing a service by the receiver according to an exemplary embodiment.

In operation S602, the receiver obtains a service ID of a selected service.

In operation S604, the receiver obtains frequency information corresponding to the selected service by using the service ID. If the frequency information cannot be obtained merely with the service ID, a frequency at which the selected service is transmitted is checked by using FIC data stored in the receiver.

In operation S606, the receiver obtains an ID of an ensemble (or an ensemble ID) through which the selected service is transmitted. The receiver obtains the ID of the ensemble through which the selected service is transmitted, by using mapping information between the service ID and the ensemble ID or SMT data in the FIC data.

In operation S608, the receiver obtains a parade ID. By removing an MSB from the ensemble ID, the parade ID can be obtained.

In operation S610, the receiver receives TPC data using the parade ID. In other words, the TPC data regarding a parade that transmits the selected service is obtained. For the TPC data, previously stored TPC data may be re-used or desired TPC data may be obtained by comparing a parade ID in TPC data obtained through each slot with the parade ID obtained in operation S608. Upon reception of the TPC data, a parade processing module is set according to channel coding information included in the TPC data.

In operation S612, the receiver gathers data of slots to form a parade.

In operation S614, the receiver forms an RS frame using the parade and error correction is performed on the RS frame. A single parade may transmit one or two RF frames. At this time, it is determined whether an RS frame transmitted using the MSB of the ensemble ID is a primary RS frame or a secondary RS frame, and a desired RS frame is identified and received.

In operation S616, the receiver processes an RS frame to extract network packets (for example, IPv4 packets). More specifically, the network packets are extracted by extracting M/H packets from the RS frame and parsing and error-processing a header of the packets.

In operation S618, the receiver obtains SMT data. If there exists valid SMT data, operation S618 may be omitted. Since the SMT data includes information for processing a service (for example, service configuration information), the network packets for transmitting the SMT data have to be processed.

In operation S620, the receiver sets a decoder to process the service by using the SMT data. The service configuration information included in the SMT data may include codec information, channel information, and sampling information for audio. Also for video, similar information may be included in the service configuration information. The receiver initializes (or sets the decoder) such that components for the service, when received, can be processed by using the service configuration information. The service configuration information may be defined in a component descriptor field.

In operation S622, upon completion of setting of the decoder, the receiver receives component streams corresponding to the service. The component stream means a stream including a component forming the service, such as an audio stream, a video stream, and a text stream.

In operation S624, the receiver combines the component streams, and then, outputs the combination to an output device. The video may be output to a display device and the audio may be output to an output device (for example, a speaker).

When the service supports a multi-sound service (that is, when a plurality of audio components exist), information about an audio component is presented to the user by using an ISO_639_language_code for the audio component. Once the user selects a desired audio component, only the selected audio component may be output. The ISO_639_language_code is composed of 3 bytes, but may be shown to the user variously according to the language setting of the receiver.

For example, if the language setting of the receiver is Korean even in case of an ISO_639_language_code "ENG", the ISO_639_language_code may be output as "영어". If the language setting of the receiver is Chinese, the ISO_639_language_code may be output as "英語". That is, the language of the audio component is expanded to the language that can be easily recognized by the user, thereby allowing the user to easily check the language of the audio component.

Service Execution 2 (when SG is Selected)

When the user selects an SG from the service list, the receiver may receive the SG by accessing another frequency or connecting to an external network such as a third-generation (3G) network (for example, a wireless local area network (LAN), Ethernet, Internet, or the like), according to a type of the SG. In case of connection to the external network such as a 3G network, data related to the SG may be received by using an IP address or an URL defined in a descriptor loop field of GAT data.

An example of receiving an SG through an M/H transmission system will be described with reference to FIG. 7.

Figure 7:
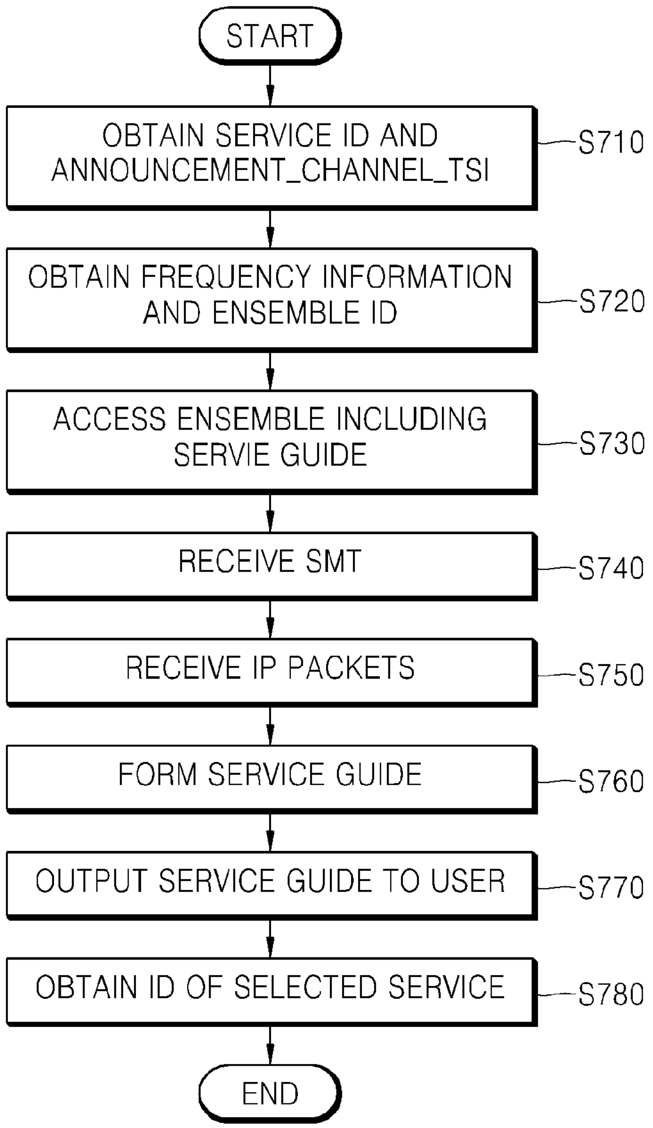
FIG. 7 is a flowchart illustrating a method of receiving a service guide by a receiver according to an exemplary embodiment.

FIG. 7 is a flowchart illustrating a method of receiving an SG by the receiver according to an exemplary embodiment.

In operation S710, the receiver obtains at least one of a service ID and announcement_channel_TSI for the SG. At least one of the service ID and the announcement_channel_TSI may be obtained in the descriptor loop field of the GAT data.

In operation S720, the receiver obtains frequency information and an ensemble ID corresponding to the SG, by using the service ID. At this time, previously stored FIC data or SMT data may be used. If there is no previously stored FIC data or SMT data, a service ID, frequency information, and ensemble information corresponding to the SG may be obtained by channel scan. The frequency information may be obtained using upper 8 bits of the service ID.

In operation S730, the receiver accesses an ensemble including the SG by using the frequency information and the ensemble ID.

In operation S740, the receiver receives SMT data in the accessed ensemble. The SMT data may include information about service components forming the SG, an IP address and port number of the SG, and other information necessary for receiving the SG (for example, file delivery over unidirectional transport (FLUTE) descriptor).

In operation S750, the receiver receives IP packets corresponding to the SG through IP filtering. According to some exemplary embodiments, fragments of the SG may be received by using announcement_channel_TSI information stored in operation S710. Since the SG is transmitted through a FLUTE session, the announcemnet_channel_TSI and TSI data of the FLUTE session are compared to gather matching data.

In operation S760, the receiver forms the SG by using fragments for the SG.

In operation S770, the receiver outputs the SG to the user.

In operation S780, once the user selects a service based on the output SG, the receiver obtains an ID of the selected service. Next, according to the process shown in FIG. 6, the selected service is output. If the selected service needs to be transmitted through another frequency or ensemble, the receiver may shift to the other frequency or ensemble to perform the operations shown in FIG. 6.

Service Execution 3 (Multi-Ensemble Processing)

Even when the user selects a plurality of services or a single service, the receiver may access two or more ensembles. When the receiver extracts packets having the same IP address from the two or more ensembles and processes the extracted packets, information for distinguishing the packets is required. In a lower layer, an ensemble ID is added to an IP address of the packets when the extracted packets are transmitted to an upper layer, thereby indicating through which ensemble the packets have been transmitted.

Basic Function of ATSC M/H Receiver

<Frequency Setting>

With a mobile system according to an exemplary embodiment, four methods of indicating frequency information will be suggested. However, a method of indicating frequency information according to the present invention is not limited to those four methods.

First, an actual frequency such as 189000 KHz may be used.

Second, a frequency may be indicated by using a channel number connected with the frequency. For example, a channel number 11 or 12 may be used as frequency information indicating a frequency.

Third, a frequency may be indicated using a service ID connected with the frequency. For example, a service ID such as 11-1 or 12-1 may be used as frequency information.

Fourth, a frequency may be indicated using a transport stream (TS) ID. For example, a transport stream ID such as 0x00001 may be used as frequency information.

The second through fourth methods described above may obtain an actual frequency by using a mapping relationship between frequencies and other information.

Shown in Table 11 is mapping information between frequencies and other information.

TABLE 11

| Frequency number | Channel number | Service id | Transport stream id |
|---|---|---|---|
| 189000 | 11 | 11-1, 11-2, 11-3 | 0x3001 |
| 195000 | 12 | 12-1, 12-2, 12-3 | 0x3002 |
| . . . | . . . | . . . | . . . |

Information shown in Table 11 may be stored in an M/H receiver or may be obtained by receiving (or searching for) an ATSC M/H broadcasting stream or a part thereof. The obtained information may be stored in a storage device such as a memory.

<Backup of TPC Data>

An ATSC M/H receiver according to an exemplary embodiment receives TPC data during reception of FIC data. This is because the FIC data and the TPC data are encoded by the same signaling data encoder. The receiver receives the TPC data for each parade, performs error correction on the TPC data, and then, stores the error-corrected TPC data in a storage device such as a memory, so that the user, when selecting a particular ensemble, can quickly access a parade corresponding to the selected ensemble with low power consumption. Unless the TPC data is previously stored, the TPC data has to be checked until a desired parade is accessed, consuming larger power than when the TPC data is previously stored.

<Network Packet Gathering>

Figure 8:
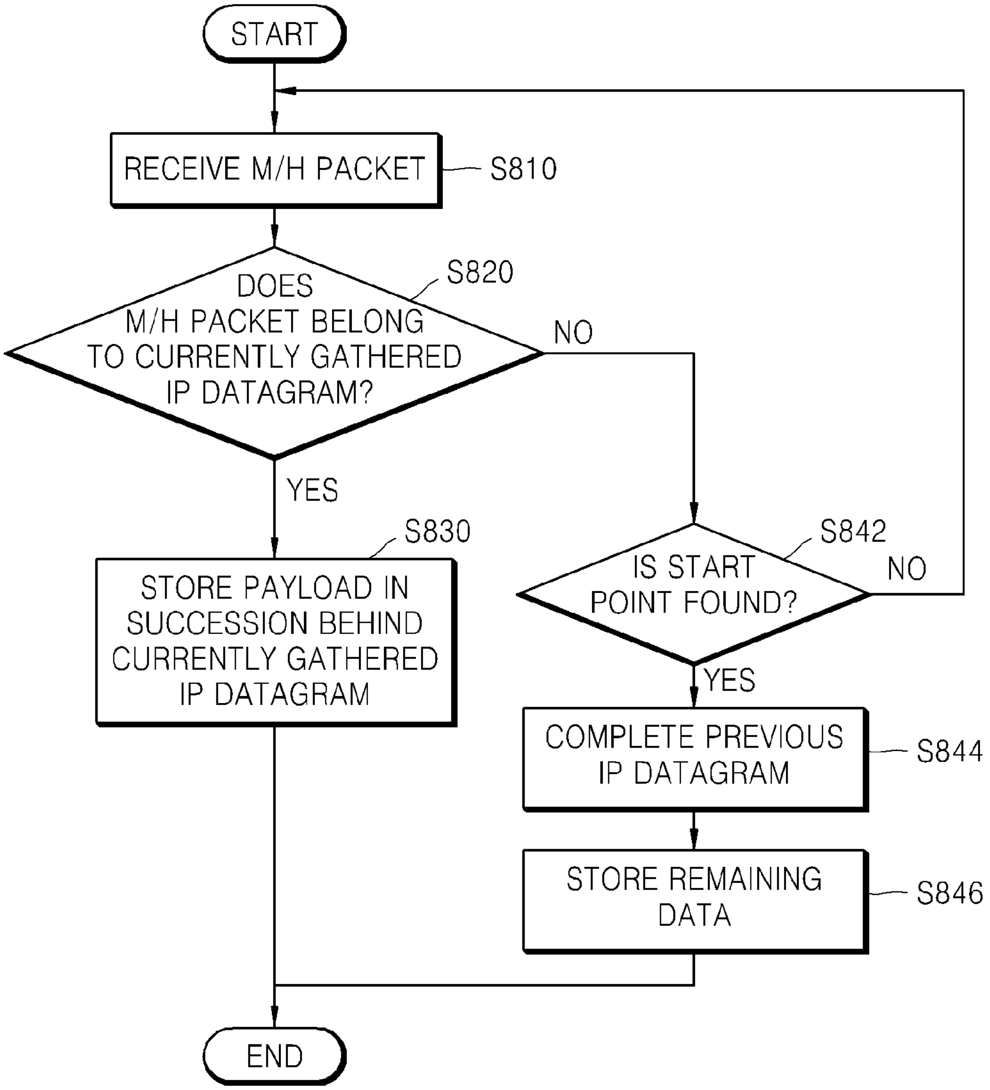
FIG. 8 is a flowchart illustrating a method of processing an Internet protocol (IP) datagram by a receiver according to an exemplary embodiment.

FIG. 8 is a flowchart illustrating a method of processing an IP datagram by the receiver according to an exemplary embodiment.

The method shown in FIG. 8 may be performed when an M/H packet is an IP datagram. Data in each column of an RS frame may correspond to a single M/H packet.

In operation S810, the receiver receives an M/H packet (for example, an M/HTS packet).

In operation S820, the receiver checks a receiving mode of the M/H packet. That is, the receiver determines whether the M/H packet belongs to an IP datagram which is currently gathered or belongs to a new (or next) IP datagram. The receiver may determine the receiving mode of the M/H packet by determining whether the currently gathered IP datagram exists and a header of the M/H packet. If the receiver determines that the currently gathered IP datagram exists, and determines from a header of the M/H packet that a new IP datagram is not received, the receiver performs operation S830. That is, if the receiver determines that the received M/H packet belongs to a previous IP datagram, the receiver performs operation S830.

The receiver may determine whether the received M/H packet belongs to the currently gathered IP datagram by comparing the total length of the IP datagram with the amount of data gathered so far. In other words, if the amount of gathered so far is equal to or larger than the total length of the IP datagram, the IP datagram has already been completed. Thus, in this case, the receiver may determine that the received packet belongs to a new IP datagram.

In operation S830, a payload of the received M/H packet is stored in succession behind the currently gathered IP datagram. That is, pure payload data except for stuffing data is stored in succession behind the currently gathered IP datagram.

On the other hand, if the receiver determines that the M/H packet belongs to a new IP datagram, the receiver performs operation S842.

In operation S842, the receiver searches for a start point of the new IP datagram in the M/H packet. If the receiver fails to find the start point of the new IP datagram in the received M/H packet, the receiver receives a next M/H packet. On the other hand, if the receiver finds the start point of the new IP datagram in the received M/H packet, the receiver performs operation S844. According to an exemplary embodiment, the receiver may perform operation S844 to complete a previous IP datagram even when the receiver fails to find the start point of the new IP datagram in the currently received M/H packet.

In operation S844, the receiver completes the previous IP datagram which has been gathered. Completing the previous IP datagram includes gathering payload data up to a start point (indicated by a pointer field) of a next IP datagram in the currently received M/H packet and storing the gathered payload data in succession behind the previous IP datagram.

In operation S846, the receiver stores the remaining valid payload data of the M/H packet in a buffer corresponding to the new IP datagram.

If an error occurs in the received M/H packet when the receiver performs the foregoing operations, the receiver completes the IP datagram. Since the currently gathered IP datagram may include one or more IP packets, the receiver may extract a valid region by analyzing a header of the currently gathered IP datagram.

For example, it is assumed that an IP datagram includes two IP packets and the current packet is a part of a second IP packet of the two IP packets. Even when an error occurs in the current packet, a first IP packet of the two IP packets is available, and thus, only the first IP packet is extracted by analyzing a header of the IP datagram.

In conclusion, a processing state of an IP datagram may be divided into a 'gathering state' and a 'new packet state'. The 'gathering state' means a state where the IP datagram is currently gathered, and the 'new packet state' means a state where an error exists in a packet or a start point of a next IP datagram is not found, and thus, the start point is searched. As a result, a point in time when gathering of the previous IP datagram is completed is the same as a point in time when the start point of the next IP datagram is found.

According to an exemplary embodiment, to speed up gathering of the previous IP datagram, upon every gathering of an M/H packet, a header of the previous IP datagram is analyzed to determine whether the IP datagram has been completed, and the gathering is finished at once when it is determined that the IP datagram has been completed. For example, the total length of the currently gathered IP datagram is compared with the currently gathered length and if they are equal to each other, the currently gathered IP datagram is completed.

<Reception of Service Signaling Table>

The service signaling table refers to a table for transmitting service related information. For example, SLT data, SMT data, and GAT data may be included in the service signaling table.

The service signaling table is transmitted to a predefined IP address and port. Thus, the receiver receives an IP datagram corresponding to the service signaling table by performing IP/port filtering.

When the service signaling table is transmitted by being divided into one or more sections, the complete service signaling table may be formed through a section_number field and a last_section_number field included in a header of the service signaling table. For example, if both the section_number field and the last_section_number field are 0, it means that a single service signaling table is formed. If the last_section_number field is larger than 0, sections as many as (last_section_number+1) are received. The section_number field has to be smaller than or equal to the last_section_number field.

Type information of the service signaling table may be indicated using a table_id field present in the header of the service signaling table.

The sections which have not yet been processed are delivered to a next module so that they can be processed by using the section_number field. A process of delivering the sections to the next module may be collectively delivering all section data or delivering section data upon every reception of the section data.

When each service signaling table is processed, a type of the service signaling table is checked through the table ID field, and then, a decoder is properly set and data is parsed.

<Update of Service Signaling Table>

Figure 9:
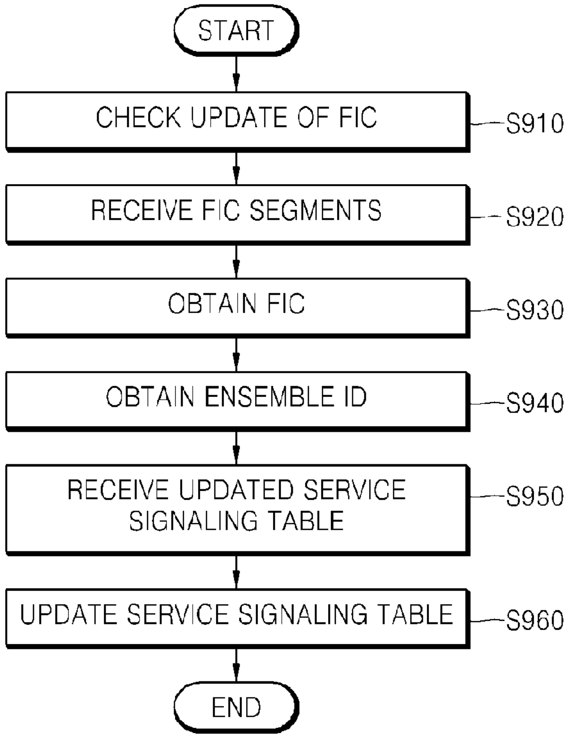
FIG. 9 is a flowchart illustrating a method of updating a service signaling table by a receiver according to an exemplary embodiment.

FIG. 9 is a flowchart illustrating a method of updating a service signaling table by the receiver according to an exemplary embodiment.

In operation S910, the receiver determines whether FIC data has been updated. If the FIC data has been updated, operation S920 is performed.

In operation S920, FIC segments are received from one or more sub-frame.

In operation S930, the FIC data is obtained using the FIC segments.

In operation S940, an ID of an ensemble through which the updated service signaling table is transmitted is obtained by using the FIC data.

In operation S950, a new service signaling table is received by receiving data transmitted through the ensemble.

In operation S960, the service signal table is updated with the new service signaling table.

When the receiver processes a plurality of ensembles at the same time, an ensemble for transmitting a currently viewed service and the ensemble for transmitting the updated service signaling table are processed at the same time. In this case, the currently viewed service is seamlessly provided even during the update of the service signaling table.

If there is no currently viewed service, several ensembles are processed at a time to rapidly update the service signaling table.

If a service signaling table associated with the currently viewed service is updated, it is notified to the user, the service is temporarily stopped, and then, the service signaling table may be updated first. Also in this case, when the user desires to continuously view the service, the service signaling table may not be updated until the service is terminated.

Extended Function of ATSC M/H Receiver

<Reference Time Setting>

To output A/V data, reference time information is necessary. In a network system, reference time information referred to as a network time protocol (NTP) may be received. In an ATSC M/H system, however, the receiver may not be connected to a network and thus has to receive reference time information within the ATSC M/H system.

According to circumstances, a standard associated with the NTP may be updated or a version of the NTP may be changed to use another NTP. Therefore, to determine whether currently transmitted NTP information is valid or available, NTP time base component data may be received to check version information of the NTP, and then, a reference time may be changed if necessary.

If the version of the NTP is different from that used in the receiver, the service may be terminated or may be continuously provided without changing the reference time. According to an exemplary embodiment, the service may be provided after a module corresponding to a new NTP version may be updated or the version of the NTP is changed.

<Initialization of A/V Codec>

In case of A/V services, each service may be composed of audio and video components, each of which is decoded by an independent decoder and then output to an output device. The decoder may be set to be suitable for component processing. Information necessary for setting the decoder may be obtained through AVC/SVC/HE AAC v2 component data.

<File Transmission Service>

When one of components forming each service is a file and a file transmission scheme is FLUTE, a setting value of FLUTE has to be checked. This value may be known by checking "M/H Component Data for FLUTE File Delivery". The receiver initializes setting of a FLUTE module by using component data and inputs the component data into the FLUTE module, thereby performing a file receiving process.

<Service Reception for Service Protection>

The user selects a service for which service protection is set. Information related to service protection (or service protection information) may be obtained from a component description loop of SMT data. For example, the receiver receives STKM (Type 39) or LTKM (Type 40).

When the receiver receives the foregoing information, right issuer information may be received through an M/H rights issuer service descriptor. The receiver may store the rights issuer service descriptor and reuse the stored rights issuer service descriptor when receiving the service protection information.

The user receives key information for receiving a service by using the foregoing information. When necessary, a registration process using a telephone, an Internet network, or the like may be performed.

The received key information may be input through the user interface or stored in a storage space of the receiver, and then may be automatically applied upon reception of the service-protection-set service.

<Firmware Update for Hidden Service>

A service may be set to a hidden service, and firmware of the receiver may be updated by using an application capable of processing components included in the hidden service. To this end, each of components included in the hidden service may include connection information regarding a firmware update program. The application checks the connection information to determine whether there is a file or an object capable of performing firmware update. If there exists a file or object capable of performing firmware update, the receiver's firmware is updated by using the found file or object. Prior to the firmware update, a process of asking the user whether to perform the firmware update may be performed.

<Open Mobile Alliance (OMA) Rich Media Environment (RME)>

When an OMA RME is used, the receiver obtains version information and level information of the OMA RME from M/H component data for OMA-RME DIMS. When the receiver cannot process the OMA RME based on the OMA RME from M/H component data for OMA-RME dynamic and multimedia interactive scenes (DIMS), it is notified to the user to inform that the service is not available.

When there is no information regarding the OMA RME such as version information and level information (version_profile & level), the user is notified that the service is not available.

However, when the information regarding the OMA RME is used as additional information and the service can be restrictively used without the information regarding the OMA RME, the service may be formed of some of the components forming the service and may be provided. For example, even when the OMA RME which cannot be processed is used, A/V data can be still output. In this case, only an A/V service is shown to the user.

However, if the OMA RME is necessarily required and thus the service cannot be provided without processing the OMA RME, the service may not be provided. In this case, the service may not be indicated in a service list according to user's setting.

<Application of New Payload Type>

Some of components forming a service may be in a form that is not defined in the ATSC M/H DTV standard. The receiver receives processing information for those components by receiving "M/H component data for dynamic range type". For a component in a form that is not defined in the ATSC M/H standard, a decoder is set using the processing information.

If the receiver does not have a decoder capable of processing the components, it may be provided with such a decoder by using a method such as an Internet network or receiver update.

<Dual Channel Service>

When the user selects one or more services, the selected services may span several frequencies. In this case, the receiver has to include a plurality of tuners for processing two or more frequencies at the same time. The tuner delivers processing result to a module capable of parallel-processing a parade and an RS frame, thereby simultaneously outputting the selected services.

However, when the receiver cannot process a parade and an RS frame in parallel, a dual channel service is restrictively available. For example, the dual channel service can be used only for a service having PRC data.

Figure 10:
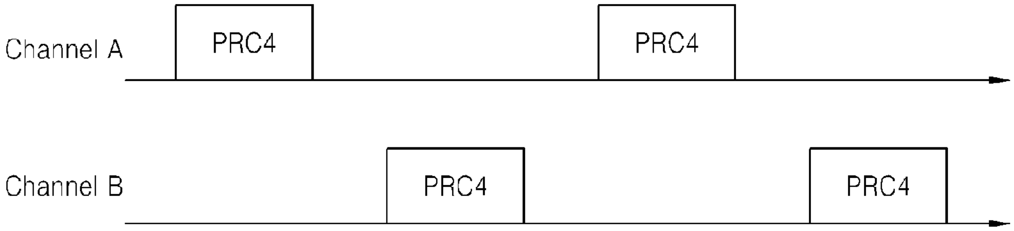
FIG. 10 is a diagram illustrating an example of providing a dual channel service by a receiver according to an exemplary embodiment.

FIG. 10 is a diagram illustrating an example of providing a dual channel service by the receiver according to an exemplary embodiment.

In FIG. 10, PRC values of a service received in channel A and a service provided in channel B are 4, which means that data related to these services is received every four M/H frames.

When the user selects a plurality of services provided in the channels A and B, there remains time until valid data is received after reception of the service provided in the channel A. Thus, during the remaining time, an M/H frame is received in the channel B, thereby providing a dual channel service.

As such, even when the tuner or processing module of the receiver cannot process two or more services in parallel, the dual channel service can be provided.

<Handover>

When the user views a service while on the move, that is, during movement from region A to region B, a handover may occur. When a transmitter exists in each of the regions A and B and a signal received from the transmitter of the region A is too poor to be processed during movement to the region B, the receiver has to receive a signal from the transmitter of the region B.

The receiver should determine whether to receive a signal from the region A or a signal from the region B based on the current position determined using a GPS and the strength of a signal received by the receiver. To obtain cell information in the current position, the receiver extracts cell index table (CIT) information from a received stream or a stream being transmitted. Since the CIT information includes neighboring cell information and a service ID, the receiver may receive a signal of a neighboring cell and check the strength of the signal. A service that is identical or similar to the currently used service has to exist in the neighboring cell to provide a handover to the user.

When the signal reception is good and there is a service identical or similar to the currently used service, the receiver performs a handover to receive a signal from a cell having good signal reception. During the handover, the service may be partially disconnected.

Error Processing

<ATSC M/H Signal Determination>

The receiver determines whether a signal is an 8VSB or ATSC signal by using information such as a received signal strength indicator (RSSI), a sync field, and segment sync, and determines whether a signal is an M/H signal based on whether TPC data is received or based on a long training sequence (LTS) present in a stream.

If the receiver determines that the signal is not the ATSC signal or is the ATSC signal, but is not the M/H signal, the ATSC M/H receiver may not operate.

<Error Processing for ATSC M/H Packet>

A header of a received M/H packet is parsed and the received packet is error-processed based on a field value as below.

If an error indicator field is set (that is, a value thereof is set to 1), the packet may be error-processed.

If a network protocol type is a type that cannot be processed by the receiver, the packet may be error-processed.

If a value of a pointer field is larger than the length of the M/H packet, the M/H packet may be error-processed. That is, the value of the pointer field should not be larger than the length of the M/H packet. However, when the pointer field has a value of 0x7ff, it is not discarded. This is because the value 0x7ff may be used to indicate that a new network packet does not start.

If a stuffing indicator field is set (that is, a value thereof is set to 1), the value of the pointer field is smaller than a value of a stuffing length field, the M/H packet may be error-processed. However, if the value of the stuffing length field is 0xff or 0xfeff, error-processing is not performed. This is because 0xff or 0xfeff may be used to indicate a case where the stuffing length is 1 and a case where the stuffing length is 2.

During a process of gathering a network packet (e.g., an IP datagram), data of a stuffing area set in the stuffing length field is discarded without being used.

<Configuration of FIC Chunk>

A module for processing an FIC segment determines whether an error exists in the FIC segment through an error correction process defined in the ATSC M/H standard. If the error is not corrected and the error still exists, a least significant bit of a most significant byte in the FIC segment is set to '1'. If the least significant bit of the most significant byte is already '1' when the FIC segment is received, it is maintained as '1' without being changed. Eventually, the least significant bit serves as an error_indicator field and indicates whether an error exists in the FIC segment.

Segments where the error_indicator field is set (that is, a value thereof is 1) are discarded without being used during configuration of an FIC chunk. In other words, only error-free segments form the FIC chunk.

For example, on the assumption that the FIC chunk is configured with FIC segments #1 through #5, the FIC segments #1, #2, #4, and #5 are received in an error-corrected state or error-free state and the FIC segment #3 is received in an error-correction-impossible state in the first M/H sub-frame. In this case, the FIC segment #3 is received again in the next M/H sub-frame to configure the FIC chunk. According to an exemplary embodiment, previously received FIC segments are all discarded and then FIC segments may be newly received from the FIC segment #1 through to the FIC segment #5 in the next M/H sub frame. Alternatively, the FIC segments #1 and #2 are stored and reception may resume with the FIC segment #3 in the next M/H sub frame. However, in both cases, an FIC segment having an error is received again without being used to form the FIC chunk.

<FIC Segment Header>

Even when an error is not found in an FIC segment, the FIC segment may be error-processed in the following cases.

A header of the FIC segment is bit-parsed according to the ATSC M/H standard to store a value of each field. If the value of each field is equal to the following value, it is discarded without being used.

If an FIC segment_type field represents data of a type that is not known to an M/H receiver or that cannot be processed by the M/H receiver, the FIC segment is error-processed.

If an FIC_chunk_major_protocol_version_number field represents a value in a range that is not known to an M/H receiver or that cannot be processed by the M/H receiver, the FIC segment is error-processed.

If a value of a current_next_indicator field means 'next', the FIC segment is not used to configure the current FIC chunk. However, the FIC segment is not used only when the FIC chunk for the current frame is configured. In other words, when a FIC chunk for the next frame is configured, the FIC segment is used to perform segment gathering.

If a value of an error_indicator field represents that an error exists in the FIC segment, the FIC segment is error-processed.

If a value of a FIC_segment_number field is larger than a value of a FIC_last_segment_number field, the FIC segment is error-processed.

The foregoing process may be used as a complementary solution for when it is determined that any error does not exist even if the error is actually present in the FIC segment during error correction. In the above-described example, since a valid FIC chunk cannot be gathered using the FIC segment, the FIC segment is error-processed (however, in case of error processing based on a FIC_segment_type field, the receiver update may be used).

<FIC Chunk Header>

If a value of each field checked by bit-parsing the header of the FIC chunk is equal to the following value, the FIC chunk is not used.

If a FIC_chunk_major_protocol_version field represents a newer version than a version supported by the M/H receiver, the FIC chunk is error-processed.

If a sum of extension lengths included in FIC data is greater than a maximum size of a FIC chunk payload (a maximum size that can be made by using a space equivalent to two and a half M/H sub-frames), the FIC chunk may be error-processed. Since the sum of extension lengths cannot be greater than the size of available FIC chunk payload data, the FIC chunk may be error-processed.

If a transport stream ID is different from an expected or previously stored transport stream ID, the FIC chunk may be error-processed. The transport stream ID for a particular frequency may be obtained from mapping information between transport stream IDs and frequencies, which is obtained during a channel scan process or stored in a terminal.

If a value of a num_ensemble field is larger than the number of ensembles that can be signaled by a FIC chunk payload, the FIC chunk is error-processed (for example, the total number of ensembles cannot exceed 32 due to physical restrictions of the M/H system).

<Error Correction for RS Frame>

Error correction for an RS frame is performed using a cyclic redundancy check (CRC) value and an RS parity value. Primarily, the CRC value is checked to check an error for a column of a RS frame where the error exists. If the error exists, a value of the error_indicator field present in a header of an M/H packet is set to indicate that the error exists. In other words, the value of the error_indicator field is set to '1'. Secondarily, error correction is performed by performing RS decoding on a row of the RS frame. If the error occurring in the column is entirely removed, the error checked by the CRC is removed. This process is repeated more than at least one time, thereby correcting errors present in the RS frame.

<Service Signaling Table>

In the following cases, a service signaling table is error-processed.

In case that a section number is greater than a last_section number, the service signaling table is error-processed.

If an ID of an ensemble through which the service signaling table is received is different from an ID of an ensemble parsed in the service signaling table, the service signaling table is error-processed.

If a protocol version that can be processed by a current terminal is lower than a protocol version indicated by a header of the service signaling table, the service signaling table is error-processed.

Figure 11:
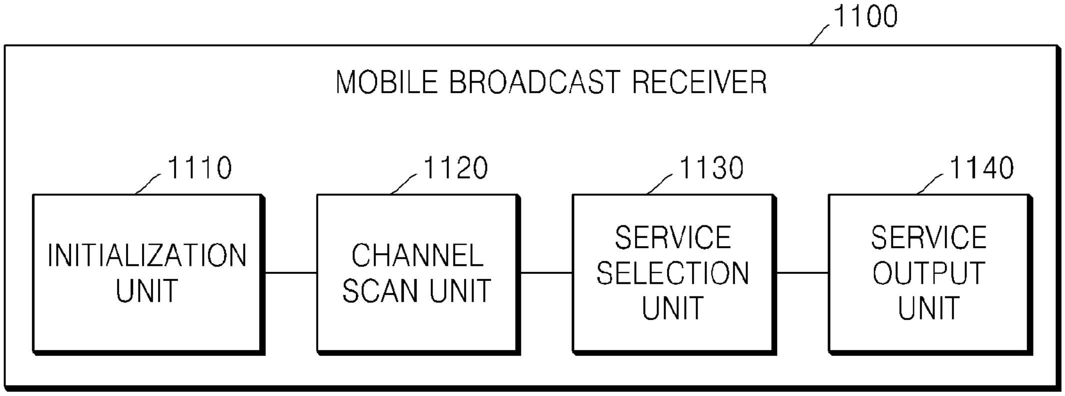
FIG. 11 is a block diagram of a receiver according to an exemplary embodiment.

FIG. 11 is a block diagram of the M/H receiver according to an exemplary embodiment.

The M/H receiver includes an initialization unit 1110, a channel scan unit 1120, a service selection unit 1130, and a service output unit 1140.

The M/H receiver extracts mobile data from a broadcast signal where main data for providing a main service and the mobile data for providing a mobile service are multiplexed, thus providing the mobile service.

The initialization unit 1110 initializes hardware and software resources upon application of power to the M/H receiver.

The channel scan unit 1120 searches for the broadcast signal in one or more frequencies to generate a list of mobile services (or a service list). The channel scan unit 1120 may generate the service list based on at least one of FIC data including access information regarding a parade and a service signaling table including additional information regarding the mobile service according to a scan mode.

The service selection unit 1130 selects a mobile service from the service list.

The service output unit 1140 provides the selected mobile service by obtaining a parade through which the selected mobile service is transmitted and processing mobile data. The parade forms one RS frame or two RS frames. If a plurality of services are selected, the service output unit 1140 processes data corresponding to the plurality of services based on a PRC value indicating a period of an M/H frame in which each of the plurality of services is transmitted. The service output unit 1140 also adds identification information about an ensemble through which each of the plurality of services is transmitted to IP packets providing the plurality of services for transmission to an upper layer.

Meanwhile, the exemplary embodiments can be embodied as a program that can be implemented on computers and embedded devices and can be implemented in general-purpose digital computers that execute the program using recording media.

Examples of the recording media include magnetic storage media such as read-only memory (ROM), floppy disks, and hard disks, and optical data storage devices such as CD-ROMs and digital versatile discs (DVD).

While the exemplary embodiments have been particularly shown and described, it will be understood by one of ordinary skill in the art that various changes in form and detail may be made therein without departing from the spirit and scope of the inventive concept as defined by the following claims. Accordingly, the disclosed exemplary embodiments should be considered in a descriptive sense not in a restrictive sense. The scope of the present inventive concept will be defined by the appended claims, and differences within a scope equivalent to the appended claims should be construed to be included in the present invention.

What is claimed is:

1. A mobile service reception method comprising:

performing a channel scan operation comprising searching in one or more frequencies for a broadcast signal which includes mobile data for providing a mobile service and generating a list of a plurality of mobile services;

selecting at least one mobile service from the list; and processing mobile data for the selected at least one mobile service by obtaining at least one parade through which the selected at least one mobile service is transmitted, wherein a parade forms one Reed Solomon (RS) frame or two RS frames.

2. The mobile service reception method of claim 1, wherein the broadcast signal further includes main data providing a main service which is multiplexed with the mobile data included in the broadcast signal.

3. The mobile service reception method of claim 1, wherein the generating the list of the plurality of mobile services is performed based on at least one of Fast Information Channel (FIC) data comprising access information regarding a parade of a corresponding mobile service and a service signaling table comprising additional information regarding the corresponding mobile service, according to a scan mode.

4. The mobile service reception method of claim 1, wherein the service signaling table is one of a service labeling table (SLT), a service map table (SMT) and a guide access table (GAT) complying with an Advanced Television Systems Committee (ATSC) standard.

5. The mobile service reception method of claim 1, wherein the list of the plurality of mobile services comprises information about a corresponding mobile service comprising at least one of an identification (ID), an ID of a corresponding ensemble, a frequency, an active or inactive status, a protection status, a component Internet protocol address, a port, a rating, a regional access status, a service time, and whether the corresponding mobile service is a charged service or a free service.

6. The mobile service reception method of claim 5, wherein the list of the plurality of mobile services further comprises service change information which indicates a cancellation or a change of the corresponding mobile service.

7. The mobile service reception method of claim 1, wherein the processing the mobile data comprises, if at least two mobile services are selected, processing the mobile data corresponding to the at least two mobile services based on a parade repetition cycle (PRC) value indicating a period in which each of the at least two mobile services is transmitted.

8. The mobile service reception method of claim 1, wherein the processing the mobile data comprises, if at least two mobile services are selected, adding identification information of an ensemble through which each of the at least two mobile services is transmitted to an Internet protocol (IP) address of IP packets for transmission to an upper layer.

9. A computer-readable non-transitory recording medium having recorded thereon a program for executing the mobile service reception method of claim 1.

10. A mobile service receiver comprising: a channel scan unit which searches in one or more frequencies for a broadcast signal which includes mobile data for providing a mobile service and generates a list of a plurality of mobile services; a service selection unit which selects at least one mobile service from the list; and a service output unit which processes mobile data for the selected at least one mobile service by obtaining at least one parade through which the selected at least one mobile service is transmitted, wherein a parade forms one Reed Solomon (RS) frame or two RS frames.

11. The mobile service receiver of claim 10, wherein the broadcast signal further includes main data providing a main service which is multiplexed with the mobile data included in the broadcast signal.

12. The mobile service receiver of claim 10, wherein the channel scan unit generates the list based on at least one of Fast Information Channel (FIC) data comprising access information regarding a parade of a corresponding mobile service and a service signaling table comprising additional information regarding the corresponding mobile service, according to a scan mode.

13. The mobile service receiver of claim 10, wherein the service signaling table is one of a service labeling table (SLT), a service map table (SMT) and a guide access table (GAT) complying with an Advanced Television Systems Committee (ATSC) standard.

14. The mobile service receiver of claim 10, wherein the list of the plurality of mobile services comprises information about a corresponding mobile service comprising at least one of an identification (ID), an ID of a corresponding ensemble, a frequency, an active or inactive status, a protection status, a component Internet protocol address, a port, a rating, a regional access status, a service time, and whether the corresponding mobile service is a charged service or a free service.

15. The mobile service receiver of claim 14, wherein the list of the plurality of mobile services further comprises service change information which indicates a cancellation or a change of the corresponding mobile service.

16. The mobile service receiver of claim 10, wherein if at least two mobile services are selected by the service selection unit, the service output unit alternately processes the at least two mobile services based on a parade repetition cycle (PRC) value indicating a period in which each of the at least two mobile services is transmitted.

17. The mobile service receiver of claim 10, wherein if at least two mobile services are selected by the service selection unit, the service output unit adds identification information of an ensemble through which each of the at least two mobile services is transmitted to an Internet protocol (IP) address of IP packets for transmission to an upper layer.

* * * * *